United States Patent

[11] 3,577,622

[72] Inventor Frank E. Shaffer
 P.O. Box 1546, Costa Mesa, Calif. 92626
[21] Appl. No. 801,070
[22] Filed Feb. 20, 1969
[45] Patented May 4, 1971

[54] SWAGING DEVICE FOR CABLE FITTINGS
 11 Claims, 5 Drawing Figs.
[52] U.S. Cl. .................................................. 29/200,
 29/203
[51] Int. Cl. ...................................................... B23p 19/00
[50] Field of Search .......................................... 29/200 (B),
 200, 203 (DT), 203 (DTS)

[56] References Cited
 UNITED STATES PATENTS
2,229,682 1/1941 Stecher ........................ 29/200

3,068,563 12/1962 Reverman .................... 29/200

Primary Examiner—Gerald A. Dost
Attorney—Fulwider, Patton, Rieber, Lee & Utecht

ABSTRACT: A swaging device for cable fittings which includes a pair of die blocks formed on their adjacent sides with confronting cavities which cooperate to receive and confine the shank of the cable fitting, one of such blocks including a plurality of pin-receiving threaded bores aligned with the cavities and projecting transversely thereof. Means are provided for fastening the blocks together and swaging pins are insertable into the passages whereby the shank of a cable fitting may be placed in the cavity, the blocks secured together, and the pins screwed inwardly in the passages to deform the wall of the shank inwardly to compress the cable while the shank is confined against undue flattening or radially outward deformation.

PATENTED MAY 4 1971
3,577,622
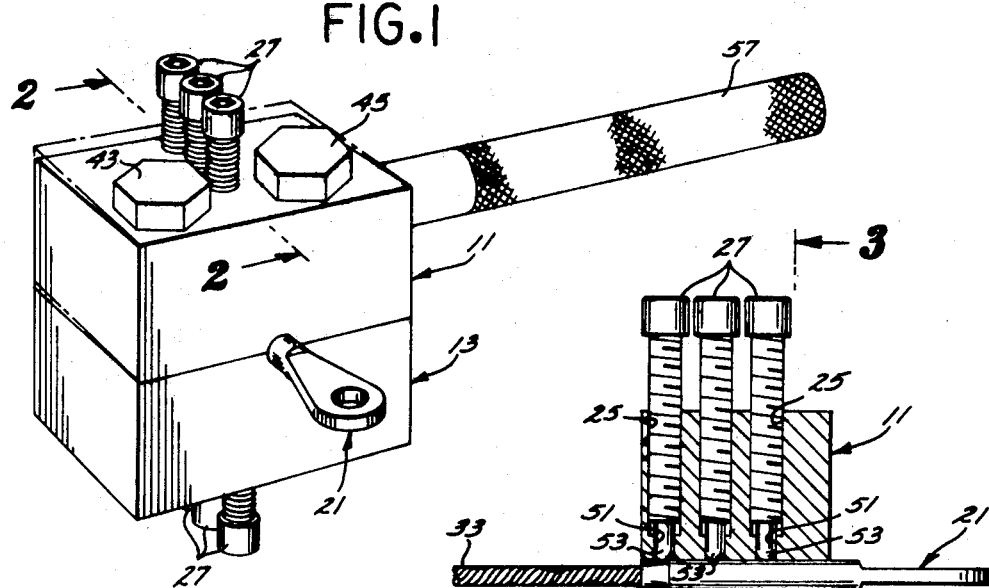
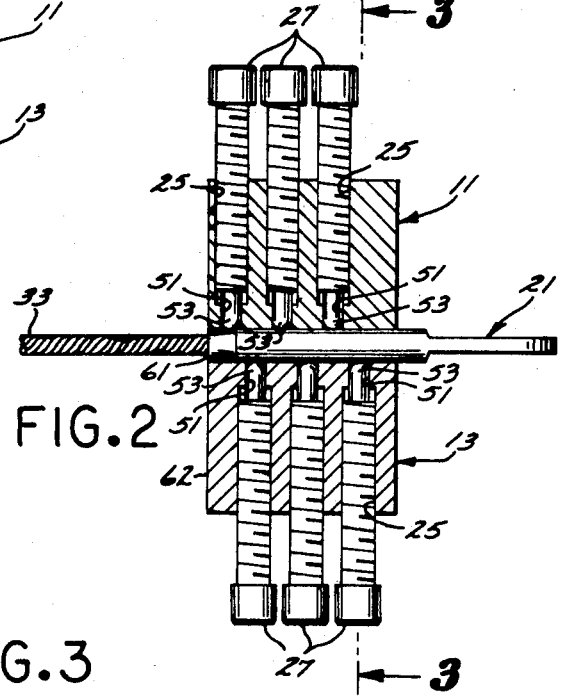
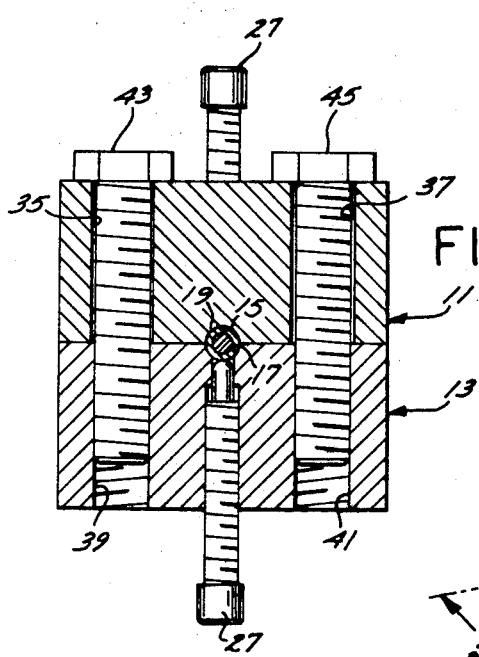
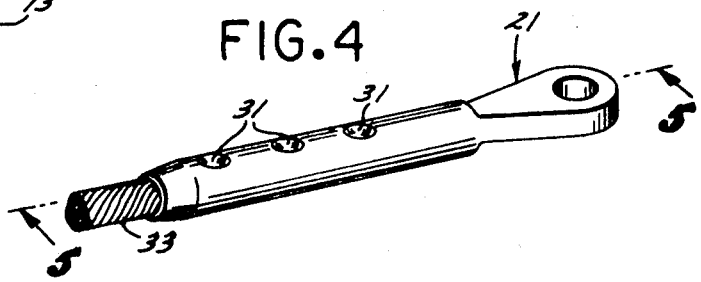
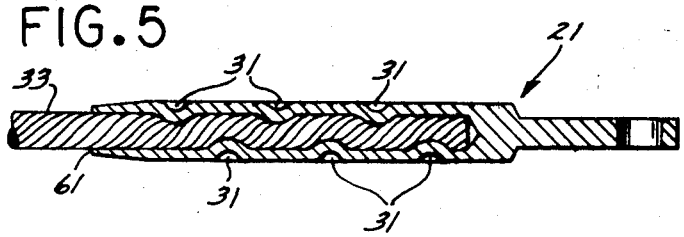
INVENTOR.
FRANK E. SHAFFER
BY Fulwider, Patton, Rieber,
Lee and Utecht
ATTORNEYS

SWAGING DEVICE FOR CABLE FITTINGS

BACKGROUND OF THE INVENTION

1. Field of the Invention

The invention relates generally to swaging devices and more particularly to swaging devices for cable fittings.

2. Description of the Prior Art

Most prior art swaging devices include relatively long bolt cutter-type handles coupled with means for producing a mechanical advantage to swage the wall of the shank inwardly on the cable. Because of the work required to produce such devices and the size thereof, they are relatively expensive to purchase and require considerable storage space.

SUMMARY OF THE INVENTION

The present invention is characterized by a pair of die blocks formed on their adjacent sides with confronting cavities for complementally receiving and confining the shank of a fitting. One of the blocks includes a plurality of pin-receiving passages aligned with the cavity and projecting laterally thereinto. Fastening means is provided for securing the blocks together and swaging pins are insertable in the passages whereby the shank of the fitting may be confined within the cavity and the pins forced inwardly thereagainst to deform the wall inwardly while the shank is confined against undue flattening or outward deformation.

An object of the present invention is to provide a swaging device of the type described which is relatively compact and convenient to operate.

Still another object of the present invention is to provide a swaging device of the type described which will secure the fitting to the cable with a minimum amount of cable deformation and weakening.

A further object of the present invention is to provide a swaging device of the type described which includes swaging pins projecting inwardly on opposite sides of the cavity and arranged in staggered relationship whereby the shank may be deformed inwardly at points alternating from one side to the other to enhance gripping of the cable.

These and other objects and the advantages of the present invention will become apparent from a consideration of the following detailed description when taken in conjunction with the accompanying drawing.

DESCRIPTION OF THE DRAWING

FIG. 1 is a perspective view of a swaging device embodying the present invention;

FIG. 2 is a vertical sectional view taken along the line 2-2 of FIG. 1;

FIG. 3 is a vertical sectional view taken along the line 3-3 of FIG. 2;

FIG. 4 is an enlarged perspective view of a cable fitting which has been swaged by the swaging device shown in FIG. 1; and FIG. 5 is a vertical sectional view taken along the line 5-5 of FIG. 4.

DESCRIPTION OF THE PREFERRED EMBODIMENT

The swaging device of present invention includes a pair of die blocks, generally designated 11 and 13 which are formed on their adjacent sides with confronting semicylindrical cavities 15 and 17, respectively, which cooperate to receive and contain the shank 19 of a cable fitting, generally designated 21. Referring to FIG. 2, a plurality of transverse threaded bores 25 are aligned with and terminate at the cavities 17 and receive threaded setscrews which form swaging pins 27. Thus, the blocks 11 and 13 may be secured together around the shank 19 to closely contain such shank while the swaging pins 27 are screwed inwardly a selected amount to deform the walls of the shank 19 inwardly to form inwardly projecting dimples 31 which compress the cable 33 to form a secure connection between such fitting and cable.

The blocks 11 and 13 are preferably metal and the cavities 15 and 17 are disposed centrally therein and extend longitudinally therethrough. Disposed on opposite sides of the cavities 15 and 17 and adjacent one end thereof are a pair of bores 35 and 37 which extend through the block 11 and are aligned with a pair of respective threaded bores 39 and 41. A pair of fastening studs 43 and 45 extend through the bores 35 and 37 and threadably engage the bores 39 and 41 to hold the blocks 11 and 13 together. It is important that there be sufficient flexibility in and between the fastening studs 43 and 45 and the blocks 11 and 13 to allow such blocks to flex apart slightly on the side remote from the studs whereby the pins 27 may be tightened an equal number to turns and will produce dimples 31 which are progressively deeper toward the right end of the shank 19, as viewed in FIG. 5.

Referring to FIG. 2, it will be noted that the swaging screw-receiving bores 25 in the block 13 are arranged in staggered relationship with respect to the bores 25 in the block 11 whereby the dimples 31 on one side of the shank 19 will be staggered with respect to the dimples on the opposite side of such shank.

The extremities of the bores 25 adjacent the respective cavities 15 and 17 are reduced in diameter at 51 for receipt of reduced-in-diameter dimples 53 formed by the inner extremities of the pins 27.

A handle 57 is affixed to the block 11 to hold the swaging device against turning while the fastening studs 43 and 45 are secured and the swaging pins 27 tightened.

In operation, the extremity of the cable 33 is inserted in the open end of the fitting shank 19, such shank placed in the cavity 17, the left-hand end 61 thereof (FIG. 2) aligned with the left side 62 of such block. The block 11 is then brought into position over the block 11 and the fastening studs 43 and 45 are inserted through the bores 35 and 37 and engaged with the respective threaded bores 39 and 41. The studs 43 and 45 are then tightened by a wrench while the handle 57 is held to prevent turning of the device. Tightening of the studs 43 and 45 will pull the blocks 11 and 13 securely together as shown in solid lines in FIG. 1.

Next, the swaging pins 27 are hand tightened against the shank 19. Referring to FIG. 2, the swaging pin 27 at the left end of the shank 19 is then tightened approximately three-fourths of a turn to swage a dimple 31 in the wall of the shank 19. During such swaging action the shank 19 is confined within the complementally shaped cavities 15 and 17 to prevent flattening or undue deformation which would result in deformation and weakening of the cable 33. The force of the first pin 27 being tightened against the shank 19 will stress the die blocks 11 and 13 and spread them at one side to the broken line position shown in FIG. 1. Thereafter, each of the swaging pins 27 are tightened three-fourths of a turn, progressing toward the right. As a consequence, the dimple nearest the cable-receiving end of the shank 19 will be the smallest, thus compressing the cable 33 the least, and each dimple will become progressively larger until the last dimple at the right-hand end of the shank (FIG. 5) is reached, such dimple compressing the cable 33 the most. This is of particular importance because the majority of the bending stress when the cable 33 is pulled at an angle from the fitting 21 is concentrated at the open end 61 (FIG. 5) of the shank 19 and it is desirable to give the cable 33 some play near the extremity of the shank to avoid excessively high bending stresses and consequent early work hardening and breaking of the cable 33. To further prevent stress concentration at the end 61 of the shank 19, the first dimple 31 at the left extremity thereof is spaced some distance from such end 61 to allow the cable 33 to assume its full uncompressed diameter at the end of the shank.

It will be clear that the staggered opposed relationship of the dimples 31 provide a longitudinally corrugated, or wavy configuration for the cable 33 within the confines of the shank 19 to give relatively effective gripping without excessive squashing or flattening of the cable 33.

From the foregoing, it will be apparent that the swaging device of present invention is relatively sturdy and inexpensive to manufacture. The device provides means for swaging a fitting on a cable without undue deformation of the cable while providing a cable-fitting joint of high integrity.

Various modifications and changes may be made with regard to the foregoing detailed description without departing from the spirit of the invention.

I claim:

1. A swaging device for swaging the shank of a cable fitting on a cable, said device comprising:

a pair of die blocks formed on their adjacent sides with confronting cavities for cooperating to receive and confine said shank, at least one of said blocks including a plurality of passages aligned with said cavities and extending laterally thereof;

fastening means for temporarily fastening said blocks together; and swaging pins for insertion into said passages whereby said shank may be placed in one of said cavities, said die blocks may be brought together, said blocks fastened together to confine said shank against undue deformation while said swaging pins are forced inwardly in said passages and against said shank to swage the wall of said shank inwardly against said cable to frictionally secure said cable therein.

2. A swaging device as set forth in claim 1 wherein said passages are internally threaded and said swaging pins are exteriorly threaded therewithin.

3. A swaging device as set forth in claim 1 wherein:

said one block is formed with a pair of through bores projecting transversely of said cavities;

the other of said blocks is formed with a pair of threaded bores confronting said through bores; and said fastening means is formed by a pair of studs projecting into said respective through bores and screwed into said respective threaded bores.

4. A swaging device as set forth in claim 1 wherein:

said passages are interiorly threaded;

said swaging pins are exteriorly threaded for being screwed into said passages; and said fastening means is disposed adjacent one end of said cavities and there is sufficient flexibility between said blocks and said fastening means to enable said fastening blocks to spread slightly at the end of said cavity opposite said fastening means when said pins are tightened whereby said fitting may be placed in said cavities with its cable-receiving end disposed at the end of said cavities opposite said fastening means and said pins tightened substantially equal amounts to provide progressively greater swaging by each pin, commencing with the pin adjacent said cable-receiving end of said shank.

5. A swaging device as set forth in claim 1 that includes a handle affixed to one of said blocks.

6. A swaging device as set forth in claim 1 wherein the fitting-engaging end of said swaging pins are rounded.

7. A swaging device for swaging the shank of a cable fitting on a cable, said device comprising:

a pair of die blocks formed on their adjacent sides with confronting cavities for cooperating to receive and confine said shank, said blocks including a plurality of passages aligned with said cavities and extending laterally thereof, the passages in one block being opposed to the and staggered with respect to the passages in the other block;

fastening means for temporarily fastening said blocks together; and swaging pins for insertion into said passages whereby said shank may be placed in one of said cavities, said die blocks may be brought together, said blocks fastened together to confine said shank against undue deformation while said swaging pins are forced inwardly in said passages and against said shank to swage the wall of said shank inwardly against said cable at opposed and staggered points on said shank to frictionally secure said cable therein.

8. A portable swaging device as set forth in claim 7 wherein:

said one block is formed with a pair of through bores projecting transversely of said cavities;

said other of said blocks is formed with a pair of threaded bores confronting said through bores; and said fastening means is formed by a pair of studs projecting into said respective through bores and screwed into said respective threaded bores.

9. A swaging device as set forth in claim 7 wherein:

said passages are interiorly threaded;

said swaging pins are exteriorly threaded with said passages; and said fastening means is disposed adjacent one end of said cavities and there is sufficient flexibility between said blocks and said fastening means to enable said fastening blocks to spread slightly at the end of said cavity opposite said fastening means when said pins are tightened whereby said fitting may be placed in said cavities with its cable-receiving end disposed at the end of said cavities opposite said fastening means and said pins tightened substantially equal amounts to provide progressively greater swaging by each pin, commencing with the pin adjacent said cable-receiving end of said shank.

10. A swaging device as set forth in claim 7 that includes a handle affixed to one of said blocks.

11. A swaging device as set forth in claim 7 wherein the fitting-engaging end of said swaging pins are rounded.